US010134208B2

(12) United States Patent
Ferry

(10) Patent No.: US 10,134,208 B2
(45) Date of Patent: Nov. 20, 2018

(54) SYSTEM AND METHOD OF INITIALIZING AND CONTROLLING LOCKS

(71) Applicant: SARGENT & GREENLEAF, INC., Nicholasville, KY (US)

(72) Inventor: James Travis Ferry, Lexington, KY (US)

(73) Assignee: Sargent & Greenleaf, Inc., Nicholasville, KY (US)

( * ) Notice: Subject to any disclaimer, the term of this patent is extended or adjusted under 35 U.S.C. 154(b) by 88 days.

(21) Appl. No.: 15/023,476

(22) PCT Filed: Sep. 22, 2014

(86) PCT No.: PCT/US2014/056718
§ 371 (c)(1),
(2) Date: Mar. 21, 2016

(87) PCT Pub. No.: WO2015/042502
PCT Pub. Date: Mar. 26, 2015

(65) Prior Publication Data
US 2016/0217634 A1    Jul. 28, 2016

Related U.S. Application Data

(60) Provisional application No. 61/880,497, filed on Sep. 20, 2013.

(51) Int. Cl.
*H04L 29/06* (2006.01)
*G07C 9/00* (2006.01)
(Continued)

(52) U.S. Cl.
CPC ..... *G07C 9/00103* (2013.01); *G07C 9/00166* (2013.01); *G07C 9/00309* (2013.01);
(Continued)

(58) Field of Classification Search
CPC ............................. H04W 12/04; H04L 67/125
See application file for complete search history.

(56) References Cited

U.S. PATENT DOCUMENTS

2005/0007243 A1*  1/2005  Emmerling ............. B60R 25/04
                                                                340/426.1
2007/0037566 A1*  2/2007  D'Agostino ....... G07C 9/00896
                                                                455/421

(Continued)

*Primary Examiner* — Ali Shayanfar
(74) *Attorney, Agent, or Firm* — Caeden Drayton; Adan Ayala

(57) ABSTRACT

A method of initializing an electronic lock in the field includes the steps of providing a unique lock identifier for a lock, providing a unique organization identifier for an organization, generating master encryption keys for the organization derived from the unique organization identifier for that organization, communicating the unique organization identifier and master encryption keys for the organization to a remote mobile device, using the mobile device to remotely generate individual encryption keys for the lock utilizing one of the master encryption keys, the unique organization identifier and the unique lock identifier for the one of the plurality of locks, and using the mobile device to remotely program a manager key to communicate the individual encryption keys to the lock. Communicating the individual encryption keys initializes the lock to the organization's lock management system and permits the lock to encrypt and decrypt communications exclusively with the organization's lock management system.

10 Claims, 3 Drawing Sheets

(51) Int. Cl.
  *H04L 29/08* (2006.01)
  *H04W 12/04* (2009.01)
(52) U.S. Cl.
  CPC ........ *G07C 9/00912* (2013.01); *H04L 67/125* (2013.01); *H04W 12/04* (2013.01); *G07C 2009/00412* (2013.01); *G07C 2009/00841* (2013.01)

(56) References Cited

U.S. PATENT DOCUMENTS

| | | | |
|---|---|---|---|
| 2007/0096870 A1* | 5/2007 | Fisher | E05B 19/0005 340/5.53 |
| 2007/0115118 A1* | 5/2007 | Hsu | G07C 9/00007 340/541 |
| 2007/0256144 A1* | 11/2007 | Hoffman | G06F 21/10 726/28 |
| 2009/0219133 A1* | 9/2009 | Woodard | G07C 9/00103 340/5.65 |
| 2011/0311052 A1* | 12/2011 | Myers | G07C 9/00103 380/270 |
| 2012/0011367 A1* | 1/2012 | Denison | G07C 9/00571 713/170 |
| 2012/0068817 A1* | 3/2012 | Fisher | G07C 9/00571 340/5.61 |
| 2015/0194002 A1* | 7/2015 | Kaczmarz | G07C 9/00174 340/5.2 |
| 2016/0217634 A1* | 7/2016 | Ferry | G07C 9/00166 |
| 2016/0241391 A1* | 8/2016 | Fenster | H04L 9/085 |

* cited by examiner

SYSTEM AND METHOD OF INITIALIZING AND CONTROLLING LOCKS

FIELD

The present disclosure relates to generally to locks, and more particularly to system for initializing and controlling locks.

A centralized management system may be used to manage a plurality of electronic locks. When adding a lock to a management system it may be necessary to initialize the lock to the management system to facilitate secure control and communication between the management system and the newly added lock.

BRIEF DESCRIPTION OF THE DRAWINGS

The above-mentioned and other features of the disclosure, and the manner of attaining them, will become more apparent and the disclosure itself will be better understood by reference to the following description taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention in any manner.

DETAILED DESCRIPTION

The embodiments disclosed herein are not intended to be exhaustive or to limit the disclosure to the precise forms disclosed in the following detailed description. Rather, the embodiments are chosen and described so that others skilled in the art may utilize their teachings.

Figure 1:
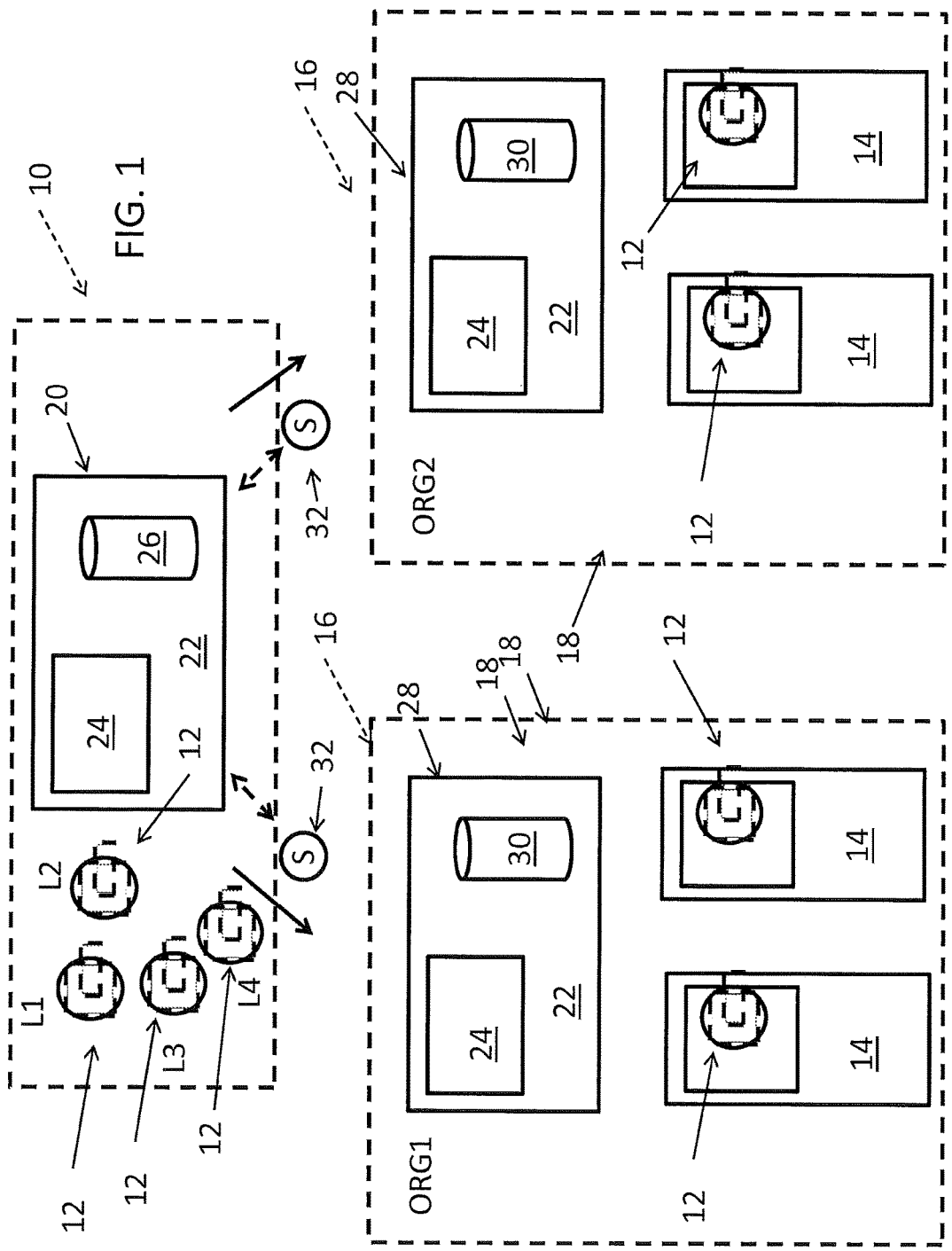
FIG. 1 is a diagrammatic view of a lock supplier and a pair of customer systems that manage a plurality of locks supplied by the lock supplier to the customers.
Figure 3:
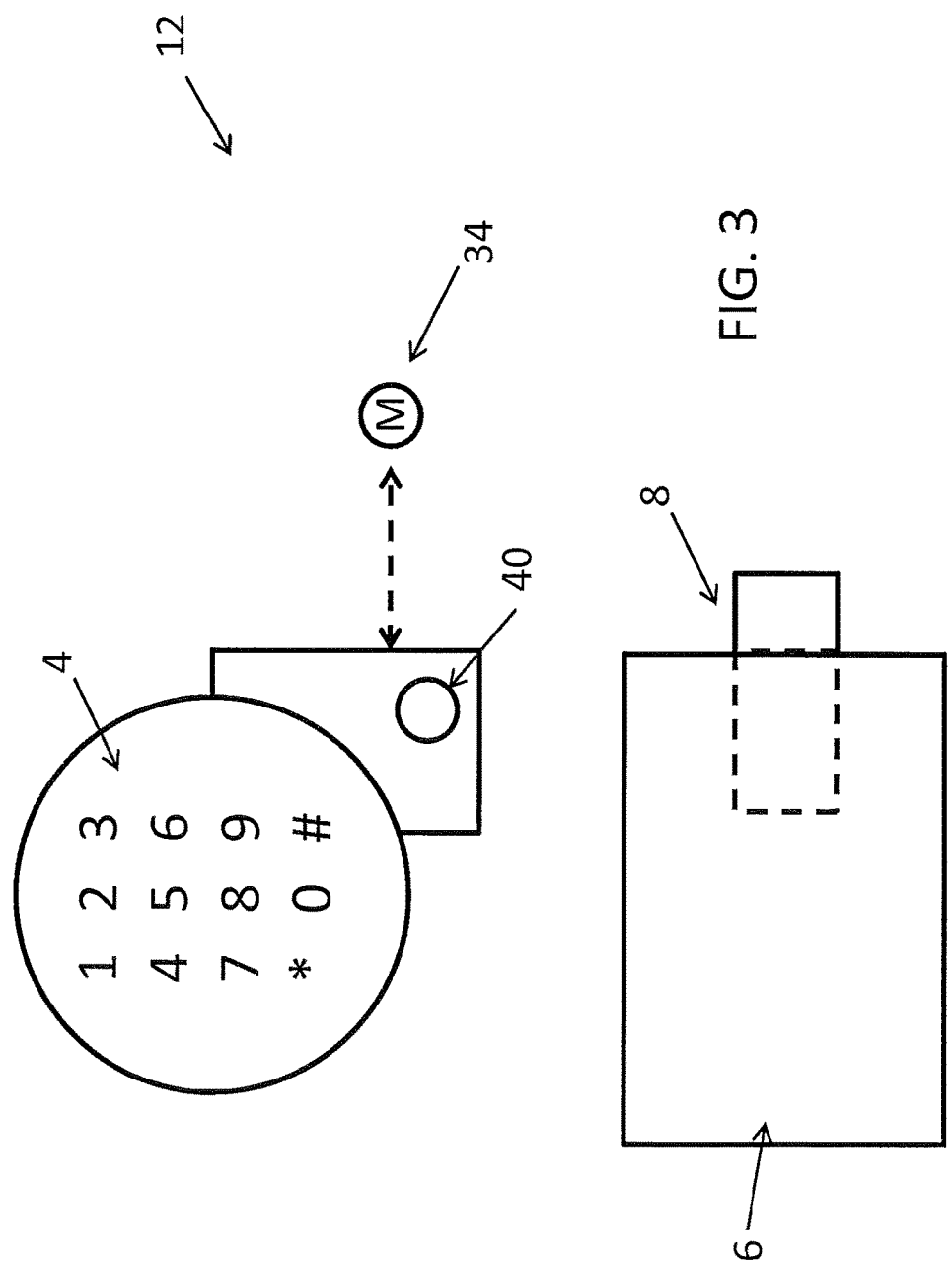
FIG. 3 is a diagrammatic view of a lock.

FIG. 1 shows a lock supplier 10, such as a manufacturer or distributor of locks 12. Locks 12 are configured to secure containers 14, such as ATM's, safes, filing cabinets, etc. As shown in FIG. 3, lock 12 may include a key pad 4 that is typically accessible on an unsecured side of a container 14, a lock housing 6 typically located on the secured side of a container 14, and a bolt 8 the extends and retracts to lock and unlock container 14. Additional details of suitable locks 12 are provided in U.S. Pat. Nos. 6,016,677; 6,094,952; and 6,212,923, the entire disclosures of which are incorporated by reference herein.

Supplier 10 provides locks 12 to organizations 16 who manage a lock system 18 that includes multiple locks 12, such as a bank, ATM operator, and cash delivery service. As part of their management function, organization 16 may install new locks 12, command locks 12 to perform certain functions, update or reprogram locks 12, send and retrieve information to locks 12, etc.

To uniquely identify each lock 12, supplier 10 provides each lock 12 with a unique identifier, such as a serial number illustrated in FIG. 1 as L1, L2, L3, and L4. According to the preferred embodiment of the present disclosure, the serial number contains 8 characters.

Similarly, supplier 10 provides each organization's lock system 18 with one or more randomly generated, unique organization identifiers illustrated as ORG1 and ORG2 in FIG. 1. As discussed in greater detail below, the lock identifier and organization identifiers are used as encryption keys that are then used to initialize new locks 12 to a lock system 18.

As shown in FIG. 1, supplier 10 has organization management system 20 that includes a computer 22 having a processor 24 and memory that includes a database 26, which may be a single database or multiple linked database stored in a single location or multiple locations. Database 26 stores the unique organization identifiers along with other information, such as the organization associated with each organization identifier. Database 26 may also store the unique lock identifiers along with other information, such as the organization associated with each lock.

As shown in FIG. 1, each organization 16 has a lock management system 28 that includes a computer 22 with a processor 24 and memory that includes a database 30, which may be a single database or multiple linked database stored in a single location or multiple locations. Database 30 stores the unique lock identifiers for locks 12 provided to that organization 16 by supplier 10 and the one or more unique organization identifiers provided to that organization 16 by supplier 10 as discussed below.

To communicate the unique organization identifiers to each respective organization 16, supplier 10 saves the organization's unique identifiers on a system key 32 that includes memory to store the unique identifiers. According to the preferred embodiment of the present disclosure, system key 32 is a memory device sold by Maxim Integrated and branded as a Maxim iButton®. Preferably, system key 32 is a disk or button-shaped device that is about the size of a US nickel that has a metal cover housing the memory. Each system key 32 has a unique digital identity or address.

Supplier 10 stores the unique organization identifiers on a system key 32 and ships this system key 32 to the respective organization 16. Upon receipt, the receiving organization 16 retrieves the unique organization identifiers and stores them into database 30 of their lock management system 28. Storing the unique organization identifiers in the respective database 30 makes this organization's database 30 unique from all other organizations' databases 30. Furthermore, one or more of the unique organization identifiers are required before the software of the respective lock management system 28 will function. For example, upon receipt from system key 32, the software will review one or more of the unique organization identifiers to compare the structure of the unique organization identifiers to expected identifiers structures. If the structure does not match, it will not permit use of the respective lock management system 28.

To enhance the security of communication between respective locks 12, respective lock management systems 28 and their components, the communication is encrypted. In order to encrypt and decrypt the communications, encryption keys are provided for each lock 12. According to the preferred embodiment of the present disclosure, the encryption keys are generated using one or more of the unique organization identifiers and the unique lock identifier for that lock 12.

Figure 2:
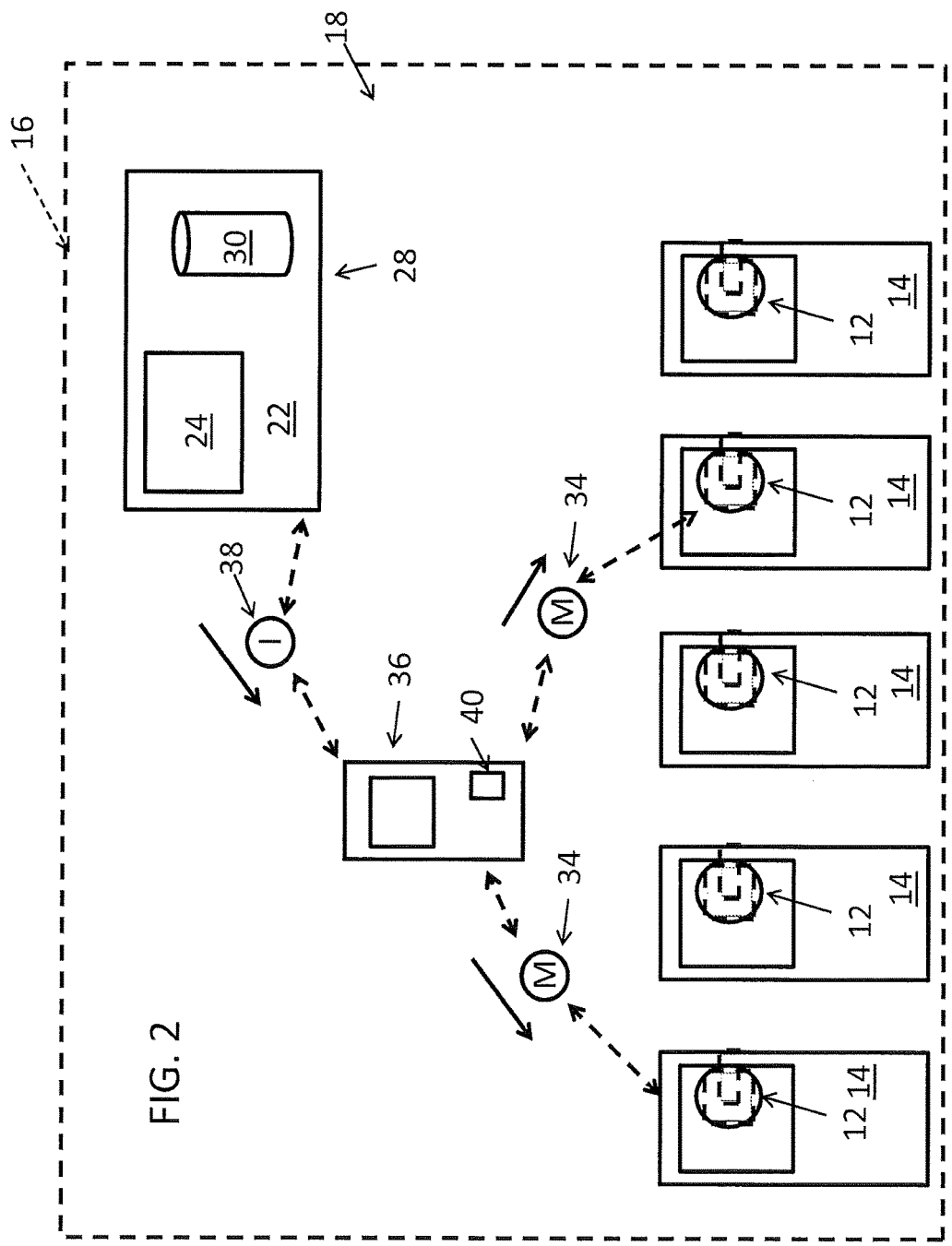
FIG. 2 is a more detailed view of one of the customer systems.

According to the preferred embodiment of the present disclosure, a manager key 34 is used to communicate the encryption keys for a particular lock 12 to that lock 12 as shown in FIG. 2. By providing the encryption keys to a particular lock 12, that lock is initialized to its respective lock management system 28 by permitting it to encrypt and decrypt communications. According to the preferred embodiment of the present disclosure, once a lock 12 is initialized to one lock management system 28, the respective lock 12 cannot be initialized to another lock management system 28.

Manager keys 34 are the same type of memory device as system keys 32. To facilitate the creation of manager keys 34 in locations that are remote from the organization, mobile devices 36, such as smart phones, tablets, laptops, and other such devices, can be utilized. Such devices typically have a battery, memory, software, one or more means of wireless communication through cell-phone systems, other wireless networks, etc., and the ability to communicate directly with manager keys 34.

In order to create manager keys 34, one or more of the unique organization identifiers is stored in one or more mobile devices 36. To communicate the unique organization identifier to each mobile device 36, one or more of the unique organization identifiers is stored in a initialization key 38. Initialization keys 38 are the same type of memory device as system and manager keys 32, 34. Each respective mobile device 36 retrieves the one or more unique organization identifiers from the respective initialization key 38. According to an alternative method, the unique organization identifiers may be communicated to mobile devices 36 using a wireless network, such as cell-phone network.

Because the respective mobile device 36 now contains one or more the unique organization identifiers, the mobile device can be used to create manager keys 34 at locations remote from the respective lock management system 28. At the remote location, a lock's unique identifier is received by the respective mobile device 36 by manual entry into the mobile device 36 or otherwise. Having both the respective lock's unique identifier and one or more of the organization's unique organization identifiers, the respective mobile device 36 generates encryption keys for the respective lock 12. These encryption keys are stored on a manager key 34. The respective manager key 34 is then positioned adjacent to the respective lock 12 and the encryption keys are received by and stored in the respective lock 12. By receiving the encryption keys, the respective lock 12 in now able to encrypt and decrypt communications to and from the respective lock management system 28 and the respective lock 12 is then initialized to the lock management system 28. As discussed above, because each lock has a unique identifier and each lock management system 28 has one or more unique organization identifiers, each lock's encryption keys are unique to the respective lock 12.

As implied above, organization management system 20, lock management system 28, mobile device 36, and lock 12 can communicate directly with any of system keys 32, manager keys 34, and initialization keys 38. For example, as shown in FIG. 3, lock 12 includes a reader/receptor 40 configured to communicate with keys 32, 34, 38. Each of organization management system 20, lock management system 28, and mobile device 36 include or are provide with reader/receptor 40 to communicate with keys 32, 34, 38. As also implied herein, keys 32, 34, 38 are physically moved from reader/receptor 40 to reader/receptor 40 to physically transport the information stored thereon from device to device. The physically transportation may be done through the mail, by a single person, or otherwise from one reader/receptor 40 to another reader/receptor 40.

In addition to initializing locks 12 to an organization's lock management system 28 by communicating encryption keys to the respective locks 12, mobile devices 36 can be used to communicate commands to locks 12 via manger keys 34. According to the preferred embodiment of the present disclosure, an operator (or software) at lock management system 28 selects one or more functions that they would like a particular lock 12 to perform. For example, the operator may want the respective lock 12 to set its date and/or time, download an audit trail (ex. times and dates when a 12 lock was opened and/or closed, which PIN code was used to operate it, error messages, etc.), setup bank features, reset a tamper function, reset a manager key 34, etc. In response to selecting a command/function, lock management system 28 collects command data necessary to perform the requested command/function. For example, if the operator wants to set the time and date of a lock 12, lock management system 28 collects data indicating which command is to be performed (i.e. setting the time and date), the time being set (ex. 9:15 AM), the date being set (ex. 19 Sep. 2013), the lock identification (Ex. L1), and a manager key identification (ex. M1). This command data is then encrypted using the operator's unique identifier and the lock's unique identifier into an operation code. According to the preferred embodiment of the present disclosure, the operation code is 8-characters long, but it may be other lengths.

To mask which operations are being performed by the respective lock 12 remotely, lock management system 28 obscures/scrambles the operation code using a predetermined manner. For example, the resulting operation code containing the encrypted operation data may be "D190113A." This operation code is converted into a transfer code by the respective lock management system 28 by scrambling/obscuring the operation code. For example, the "D" for the date change may be changed to a "4" and moved to the end of the string and the "A" for the audit download changed to a "1" and moved to the beginning of the string so that a transfer code of "11901134" is created. Additional obscuring/scrambling of the operation code may also be done to further obscure/scramble the operation code resulting in the transfer code. According to one embodiment of the present disclosure, the method of obscuring/scrambling is unique to each lock 12 based on its unique lock identification. According to the preferred embodiment of the present disclosure, the transfer code is ten characters long, but it may be other lengths.

As a result of the obscuring/scrambling, the transfer code is generated and displayed to the operator by lock management system 28 on a display (not shown). At a remote location, a user of a mobile device 36 communicates with the operator, preferably over a phone, such as the respective mobile device 36 itself. The operator reads or otherwise communicates the transfer code to the mobile device user who then manually or otherwise enters the transfer code into the respective mobile device 36. Knowing the predetermined method of un-obscuring/unscrambling the transfer code, the respective mobile device 36 recreates the command data so that the command data can be programmed onto the manager key 34, which can be used for the operation code.

The command data is then transferred to a manager key 34 without displaying the command data to the user. By masking the operation code, it is more difficult or impossible for the mobile device user (or someone watching the mobile device user) to determine which commands are being communicated to the respective lock 12 via a manager key 34.

As mentioned above, at the remote location, mobile device 36 then communicates command data to a respective manager key 34. The respective manager key 34 can then communicate the command data to the respective lock 12, which then performs the requested commands.

As mentioned above, the command data not only includes data indicating which commands are to be performed and the necessary data to perform the function, but also include the unique lock identification. If the respective lock 12 receives command data from a manager key 34 that does not include its own unique lock identification, the respective lock 12 rejects the command data by refusing to act upon the received commands. If the respective lock 12 receives the correct lock identification, it will execute the commands if all other received parameters are correct. For example, if the unique identification (ex. M2) of the respective manager key 34 providing the command data does not match the unique manager key identification (ex. M1) provided in the command data, the respective lock 12 rejects the command data because it came from an unauthorized manager key 34.

While this invention has been described as having preferred designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this disclosure pertains.

The invention claimed is:

1. A method of remotely initializing an electronic lock at a remote location comprising the steps of:
   providing a unique lock identifier for each of a plurality of locks;
   providing a unique organization identifier for an organization, wherein the organization controls a lock management system utilizing the plurality of locks;
   generating encryption keys for the organization derived from the unique organization identifier for that organization;
   loading at least one of a unique organization identifier or unique lock identifier into a database;
   communicating the unique organization identifier and encryption keys for the organization to a remote mobile device;
   using the mobile device to remotely generate individual encryption keys for one of the plurality of locks at the remote location utilizing at least one of the encryption keys, the unique organization identifier and the unique lock identifier for the one of the plurality of locks;
   using the mobile device to remotely program a manager key to communicate the individual encryption keys for one of the plurality of locks to the one of the plurality of locks, the communication of the individual encryption keys initializing the one of a plurality of locks to that organization's lock management system and permitting that one of a plurality of locks to encrypt and decrypt communications exclusively with the organization's lock management system.

2. The method of claim 1 wherein the step of providing a unique organization identifier includes the step of loading the unique organization identifier onto the system key having a unique digital identity.

3. The method of claim 2 wherein the step of providing a unique lock identifier includes the step of loading the unique lock identifier onto the system key.

4. The method of claim 1 further including the step of loading a field service application on the mobile device.

5. The method of claim 1 wherein the step of remotely programming a manager key to communicate the individual encryption keys is performed by the field service application.

6. The method of claim 1 further including the step of loading the unique lock identifier for each of a plurality of locks and the unique organization identifier for an organization in a database.

7. The method of claim 1 further including the step of providing a manager key for communicating the unique organization identifier and encryption keys.

8. A method of remotely initializing electronic locks in the field comprising the steps of:
   providing a unique lock identifier for each of a plurality of locks;
   providing at least one unique organization identifier for an organization, wherein the organization controls a lock management system utilizing the plurality of locks, the unique lock identifier and the at least one unique organization identifier being loaded on a system key;
   generating encryption keys for the organization derived from the at least one unique organization identifier for that organization;
   loading at least one of a unique organization identifier or unique lock identifier into a database;
   providing a manager key to communicate the at least one unique organization identifier and encryption keys for the organization to a remote mobile device in the field;
   using the mobile device to remotely generate individual encryption keys for one of the plurality of locks utilizing at least one of the encryption keys and the unique organization identifier and the unique lock identifier for the one of the plurality of locks;
   using the mobile device to remotely program a manager key to communicate the individual encryption keys for one of the plurality of locks to the one of the plurality of locks, the communication of the individual encryption keys initializing the one of a plurality of locks to that organization's lock management system and permitting that one of a plurality of locks to encrypt and decrypt communications exclusively with the organization's lock management system.

9. An electronic lock system comprising:
   a plurality of locks, wherein the plurality of locks has a unique lock identifier;
   an organization having a unique organization identifier, wherein the organization controls a lock management system utilizing the plurality of locks;
   a database for loading the unique organization identifier or unique lock identifier; and
   the lock system generating encryption keys for the organization derived from the unique organization identifier for that organization and communicating the unique organization identifier and encryption keys for the organization to a remote mobile device,
   using the mobile device to remotely generate individual encryption keys for one of the plurality of locks at the remote location utilizing at least one of the encryption keys, the unique organization identifier and the unique lock identifier for the one of the plurality of locks,
   and using the mobile device to remotely program a manager key to communicate the individual encryption keys for one of the plurality of locks to the one of the plurality of locks, the communication of the individual encryption keys initializing the one of a plurality of locks to that organization's lock management system and permitting that one of a plurality of locks to encrypt and decrypt communications exclusively with the organization's lock management system.

10. The electronic lock system of claim 9, wherein the electronic lock system is configured to generate the encryption key using the unique organization identifier.

* * * * *